US011645637B2

(12) United States Patent
Bonestell et al.

(10) Patent No.: US 11,645,637 B2
(45) Date of Patent: *May 9, 2023

(54) SYSTEMS AND METHODS FOR PAYMENT PROCESSING ON PLATFORMS

(71) Applicant: Worldpay, LLC, Symmes Township, OH (US)

(72) Inventors: Robert Bonestell, Durango, CO (US); Kevin Oliver, Durango, CO (US); Matthew D. Ozvat, Durango, CO (US); Andrew Harris, Denver, CO (US); Daniel Ourada, Bend, OR (US)

(73) Assignee: Worldpay, LLC, Symmes Township, OH (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/546,531

(22) Filed: Aug. 21, 2019

(65) Prior Publication Data
US 2019/0378106 A1    Dec. 12, 2019

Related U.S. Application Data

(63) Continuation of application No. 14/327,455, filed on Jul. 9, 2014, now Pat. No. 10,430,771, which is a continuation-in-part of application No. 13/563,534, filed on Jul. 31, 2012, now Pat. No. 10,339,524.

(51) Int. Cl.
*G06Q 20/38* (2012.01)
*G06Q 20/20* (2012.01)
*G06Q 20/32* (2012.01)
*G06Q 20/40* (2012.01)

(52) U.S. Cl.
CPC ......... *G06Q 20/20* (2013.01); *G06Q 20/322* (2013.01); *G06Q 20/382* (2013.01); *G06Q 20/38215* (2013.01); *G06Q 20/401* (2013.01)

(58) Field of Classification Search
CPC ..................................... G06Q 20/20
USPC .......................................... 705/65
See application file for complete search history.

(56) References Cited

U.S. PATENT DOCUMENTS

| | | | |
|---|---|---|---|
| 7,127,545 B1 * | 10/2006 | Nandi | G06F 3/067 710/316 |
| 8,661,429 B2 | 2/2014 | Ruster et al. | |
| 10,430,771 B2 * | 10/2019 | Bonestell | G06Q 20/38215 |
| 2004/0032880 A1 * | 2/2004 | Leung | H04W 8/245 370/328 |

(Continued)

*Primary Examiner* — Chinedu C Agwumezie
(74) *Attorney, Agent, or Firm* — Bookoff McAndrews, PLLC

(57) ABSTRACT

Systems and methods for payment processing on devices are provided. Such systems and methods enable payment processing to be completed with a peripheral device (such as a magnetic card reader) and a point of sales system, without the need for extensive developer integration. The system receives a payment charge amount from a point of sales system. The system also detects (or dynamically populates) peripheral devices that are used to capture account information. The peripheral device is a supported device type with an associated library, which includes data for properly interfacing with the peripheral device. The system provides the captured account data, a merchant ID and the amount of the charge to a payment management system. The system likewise receives a response (approve or decline) from the payment management system.

20 Claims, 21 Drawing Sheets

(56) References Cited

U.S. PATENT DOCUMENTS

| | | | |
|---|---|---|---|
| 2009/0037284 A1* | 2/2009 | Lewis | G06Q 20/202 705/16 |
| 2011/0055033 A1* | 3/2011 | Chen | G06Q 20/20 705/16 |
| 2012/0231780 A1 | 9/2012 | Kharon et al. | |
| 2012/0317035 A1 | 12/2012 | Royyuru et al. | |
| 2013/0179351 A1* | 7/2013 | Wallner | G07F 7/088 705/71 |
| 2013/0181045 A1 | 7/2013 | Dessert et al. | |
| 2013/0305035 A1* | 11/2013 | Lyne | H04W 12/02 713/150 |
| 2014/0143145 A1* | 5/2014 | Kortina | G06Q 20/322 705/44 |
| 2014/0172596 A1 | 6/2014 | Cate | |
| 2015/0186864 A1 | 7/2015 | Jones et al. | |
| 2016/0034876 A1* | 2/2016 | Speiser | G06Q 20/384 705/21 |

\* cited by examiner

SYSTEMS AND METHODS FOR PAYMENT PROCESSING ON PLATFORMS

CROSS REFERENCE TO RELATED APPLICATIONS

This application is a continuation of and claims the benefit of priority to U.S. patent application Ser. No. 14/327,455, filed on Jul. 9, 2014, which is a continuation-in-part of U.S. patent application Ser. No. 13/563,534, filed on Jul. 31, 2012 (now U.S. Pat. No. 10,339,524, issued on Jul. 2, 2019), which are incorporated herein by reference in their entireties.

BACKGROUND

This invention relates generally to systems and methods for payment processing support for mobile devices, or other nontraditional Point of Sales (POS) platforms. Such systems and methods enable smaller merchants the ability to more readily accept credit card, and other forms of payment using a device (often mobile such as a tablet or smart phone) and a magnetic reader peripheral device, without the need for extensive developer API integration.

Payments can traditionally be performed using cash, magnetic credit card or debit cards, or using a check. Other payment mechanisms, such as smart credit cards, have never experienced the success in the marketplace that these more traditional forms of payment have enjoyed. Given the increasingly prominent role credit/debit cards are having as payment mediums, merchants have greater incentive to accept these payment forms in addition (or instead of) cash or check. In fact, it is nearing the point that even small merchants, or mobile merchants, are even required to accept credit card transactions, or otherwise lose out on business.

In response to this growing need for affordable and small credit card processing, a number of companies have developed systems that take advantage of the growing prevalence of smart phones and tablets. These systems typically include a peripheral device capable of reading the magnetic information on the payment card, and utilize the processing power and network connectivity of the respective mobile device in order to complete the transaction. An example of such a peripheral device system is Square.

While such systems have gone a long way to enable virtually anyone to accept credit card transactions, these systems are still plagued by issues relating to developer integration. For example, the Square device is designed to operate in conjunction with their integrated POS system and payment backend. The user of the Square device is essentially forced to use the processor that Square has agreements with. Likewise, the user is pigeonholed into the pricing scheme that Square and the backend payment processor have agreed to.

If the user wanted to use the peripheral device with another payment processor, or point of sales system, a developer would need to integrate directly to the peripheral device. This is a substantial undertaking in itself, but when viewed against the numerous peripheral devices available, the task soon becomes overwhelming. For this reason, generic peripheral card reading devices have not seen widespread adoption. Additionally, most merchants are indeed forced to use the pre-developed POS system and backend that is typically supplied by the device supplier. This adds significant costs to the merchant. For example, at the time of this disclosure, the cost per transaction over a standard payment processing network varies between 1.5-2.3%. In contrast, the fee imposed by Square, as a comparison, is at 2.75%. Considering that smaller merchants already are faced with higher overhead and smaller margins than larger retailers, the fact that they are then subjected to higher fees may indeed impact their ability to compete in the market.

It is therefore apparent that an urgent need exists for systems and methods for payment processing from these nontraditional POS systems which decouple the device peripheral from the payment processing, without the need for extensive developer integration. Such systems will have the benefit of providing greater market availability to merchants and POS developers.

SUMMARY

To achieve the foregoing and in accordance with the present invention, systems and methods for payment processing on devices is provided. Such systems and methods enable payment processing to be completed with a peripheral device (such as a magnetic card reader) and a point of sales system, without the need for extensive developer integration.

In some embodiments, the system receives a payment charge amount from a point of sales system. The system also detects any peripheral devices present that are used to capture account information. Again, one example of such a peripheral device is a magnetic card reader. The peripheral device is a supported device type with an associated library. The library includes the data required to properly interface with the peripheral device.

In some embodiments, the system may dynamically populate alternate payment types which are supported. The user may then select one of these alternate payment types and the library corresponding to the selection may be retrieved. In this manner, the payment type versatility may be expanded to meet the user's needs and open a broader range of consumers.

Once the peripheral device has been detected, the captured account information is received. Typically the account information is encrypted at the peripheral device for security purposes. The system provides this account data, a merchant ID and the amount of the charge to a payment management system. The payment management system works with the financial institutions to validate the payment and transfer funds accordingly. The system likewise receives a response (approve or decline) from the payment management system. In some embodiments the response may also include a token which includes the primary account information in an encrypted form.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
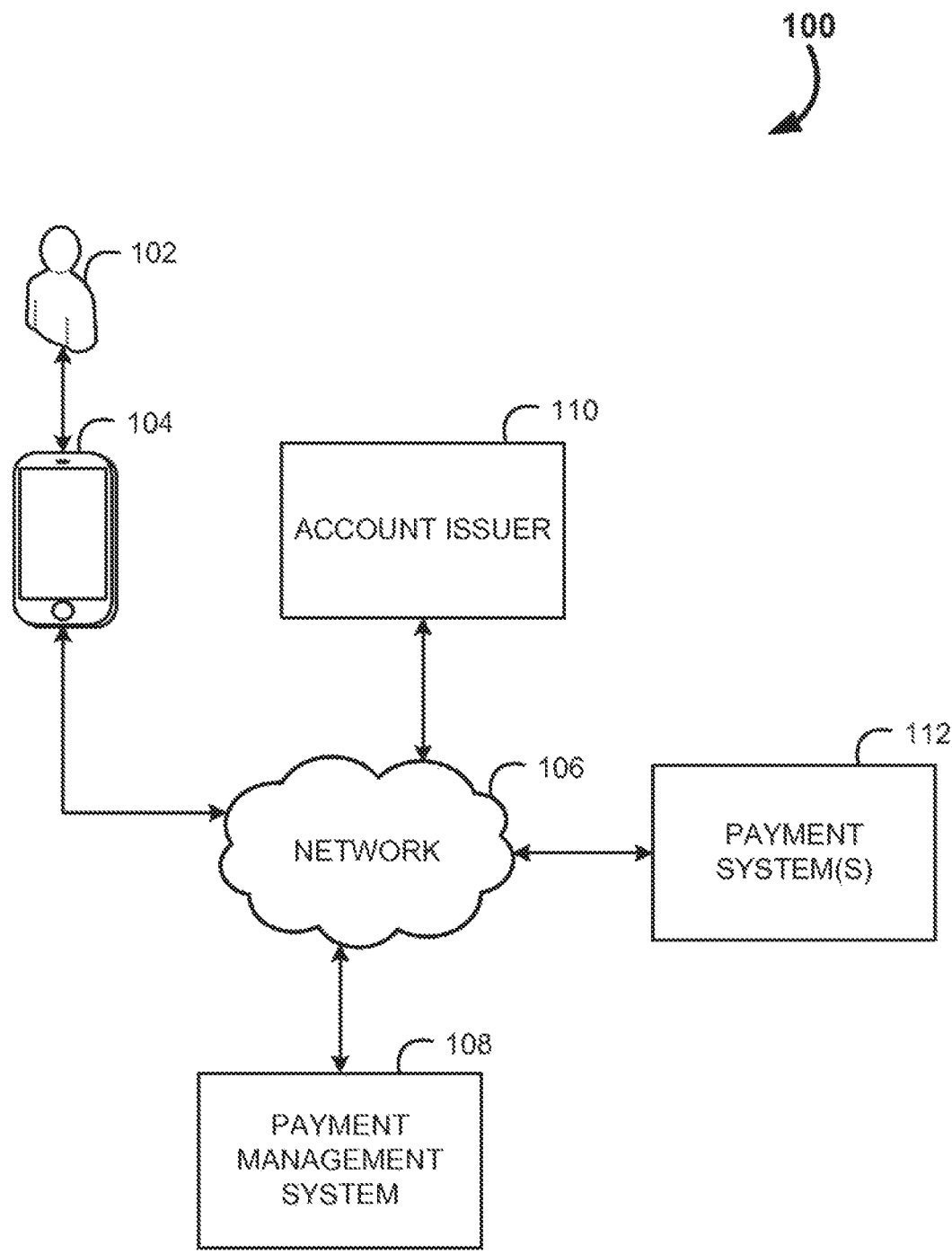
FIG. 1 is an example schematic block diagram for a system for managing payments, in accordance with some embodiments.

The present invention will now be described in detail with reference to several embodiments thereof as illustrated in the accompanying drawings. In the following description, numerous specific details arc set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the an that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as railing within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally" are not meant to limit the scope of the present invention as the embodiments disclosed herein are merely exemplary.

The following discussion relates to methods and systems for payment management which supports mobile payments. Such systems and methods enable payment integration with a wide variety of peripheral card reader devices without the need for extensive developer input, and further provide the added benefit of eliminating the need to store sensitive account data by merchants.

The term "mobile payments" as used herein is intended to refer to means for payments which utilize a mobile device running a payment application. Such application may provide a wireless signal, scan-able barcode, or magnetic interface in order to transmit data to effectuate the payment.

The term "mobile device" as used herein typically refers to tablets or smart phones which leverage an external card reader peripheral device in order to become an ad hoc Point of Sales (POS) platform. However, while the enumerated mobile devices are the most common devices employed, the term "mobile device" may refer to any device that traditionally is not a dedicated POS system, such as a laptop, PC, smart watch, or any other suitable computing device.

Lastly, the term "merchant" and "user" are often utilized within the scope of this disclosure interchangeably. It is understood that a merchant may be a retailer, service provider, or even merely a payment processor for other merchants.

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. Payment Processing Interface

Throughout this disclosure, the term "Payment Processing Interface" is used to designate the functionality present, on the mobile device which "bridges the gap" between the card reader periphery and backend payment processors. Further details of the Payment Processing Interface function and architecture will be provided in considerable detail in the following sections.

To facilitate this discussion, FIG. 1 provides an example schematic block diagram for a system for payment management, shown generally at 100. In this example block diagram, a purchaser may interact with a merchant 102. The merchant utilizes a mobile device 104 as the point of sale terminal in order to perform the transaction.

The mobile device 104 includes a coupled card reader peripheral device which is able to collect the payment information from the purchaser, and leveraging the Payment Processing Interface resource bundle, can communicate with a payment management system 108, via a network 106. In some cases, the peripheral device may encrypt the collected data at the reader head (if utilized) in order to ensure security. Alternatively the initial encryption may be performed in software deeper in the mobile device 104, in some embodiments. Software encryption, however, increases vulnerability to security breach if the mobile device 104 has been compromised.

The network 106 most typically includes the internet, but may also include other networks such as a corporate WAN, cellular network, or combination thereof, for example. The network 106 may be employed to provide communications between the various entities required to complete the payment.

The data provided to the payment management system 108 typically includes at least the account information (in encrypted format), an identifier for the merchant, and the transaction amount. The payment management system 108 then decrypts the account information, and sends a request to the proper payment system 112 for approval of the transaction. An example of the payment system 112 includes MasterCard, Visa and PayPal, for example. The payment system 112 provides back an acceptance or denial of the transaction, which is provided back from the payment management system 108 to the mobile device 104. The payment management system 108, in the case of an approval, also contacts the account issuer 110 for the actual transfer of the appropriate funds. The account issuer 110 is often a traditional bank or other financial institution.

In some embodiments, tokenization may be employed to ensure that the response sent back to the mobile device 104 includes a token rather than account information. The merchant may then store the encrypted token in a local database for later transactions. In some embodiments, a tokenizer encryption service validates credentials and identifies keys for the encrypted data. The tokenizer encryption service may leverage a data tier populated by an analytics system and CRM application(s) in order to perform validation and identification of keys. The data is then submitted to a hardware security module for decryption and the generation of a token. The token includes a primary account number (PAN), a group ID (GID), an expiration date for the token, and an expiration date for the card.

In some embodiments, the expiration date of the token may be varied depending upon if the token is designated as a single use token, or for recurring transactions (i.e., a subscription). For example, a 1 year and 2 year expiration may be provided for a single use and recurring token, respectively. This allows for a longer validity period where the merchant is anticipating reuse of the token, and ensures that tokens are not stored unnecessarily long for single use tokens.

Additionally, embodiments of the present system include a GID (group ID) which enables more than one merchant to utilize the token. The data tier maintains a copy of merchant IDs and correlates them with one or more GIDs. When a token is supplied to the system during a later transaction, the GID in the token is compared against the merchant ID listed in the data tier. If they match, then the payment management system 108 may process the token.

Unlike current tokenization technology, the PAN (primary account number) is stored as part of the token, with the merchant, in encrypted form. The merchant cannot access the PAN without the keys maintained within the hardware security module 108. Thus, for account information to be compromised, both the merchant system and the tokenization and payment management system 108 would need to be breached. In all other known token based systems, the PAN is stored exclusively upon the payment processor's system, enabling a hacker to collect account information by breaching a single system.

By encrypting the account data at the card reader head, and returning a token to the mobile device rather than actual account data, sensitive financial data is protected from being compromised, even if the mobile device itself is already infected with malware. This is known as End to End (E2E) encryption of data. More details of the tokenization process, and E2E encryption may be found in the priority application Ser. No. 13/563,534, filed on Jul. 31, 2012, entitled "Systems and Methods for Multi-Merchant Tokenization", which has been incorporated herein in its entirety.

Figure 2:
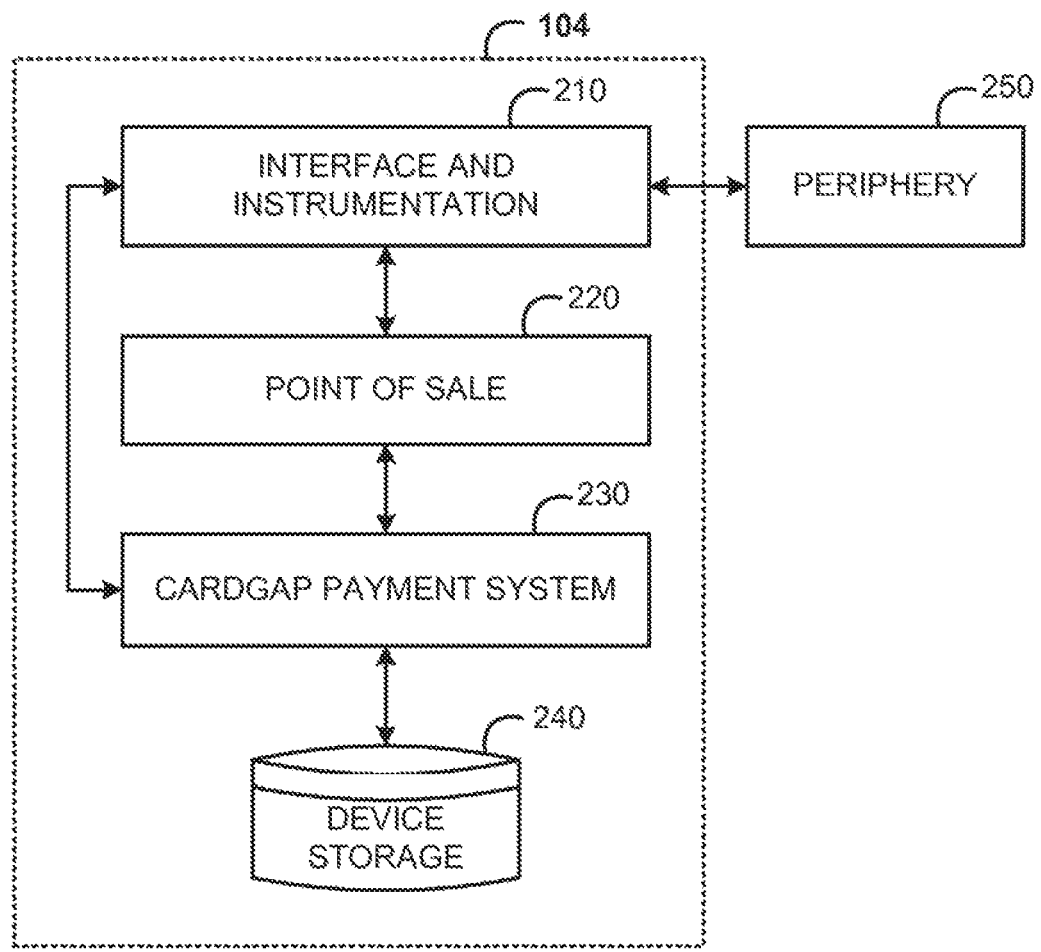
FIG. 2 is an example schematic block diagram for the mobile device being employed for the transaction, in accordance with some embodiments.

Moving on to FIG. 2, a more detailed example block diagram of the mobile device 104 is provided. The mobile device includes a number of discrete modules, including an interface and instrumentation 210 module, a point of sales 220 application, and the Payment Processing Interface payment system 230, which is central to this disclosure. In addition, a device storage 240 is likewise present and may be employed for storing tokens, merchant IDs, inventory information (for the POS program), etc.

The interface and instrumentation 210 module connects with the device display, integrated input mechanisms (such as a keyboard or touch screen), as well as peripheral devices 250. One such peripheral device 250 includes a magnetic card reader, for example. While particular attention will be placed on the use of a magnetic reader, other payment inputs arc likewise considered, such as smart card readers, optical readers (for instant check payments, for example), or e-wallet interfaces, for example. The terms 'card reader', and even 'magnetic card reader', are intended to be understood to cover any such payment input mechanisms.

The point of sales 220 program is initially launched by the merchant 102, and used to tabulate the value of the transaction. As previously noted, the POS 220 program may utilize inventory data stored in the device storage 240 in order to facilitate this process. POS 220 programs are known, and any such POS program may be employed in the present system.

The Payment Processing Interface payment system 230 may be launched upon completion of the tabulation of the transaction. The Payment Processing Interface payment system 230 pulls the account information, which may be encrypted at the peripheral device 250, and receives user input regarding the transaction amount. This account data, transaction amount, and merchant ID stored in the storage 240 are provided to the payment management system 108 for backend verification, as detailed above. Once the Payment Processing Interface payment system 230 receives a response (success or decline), the user may be redirected to the POS 220 system for receipt generation.

Figure 3:
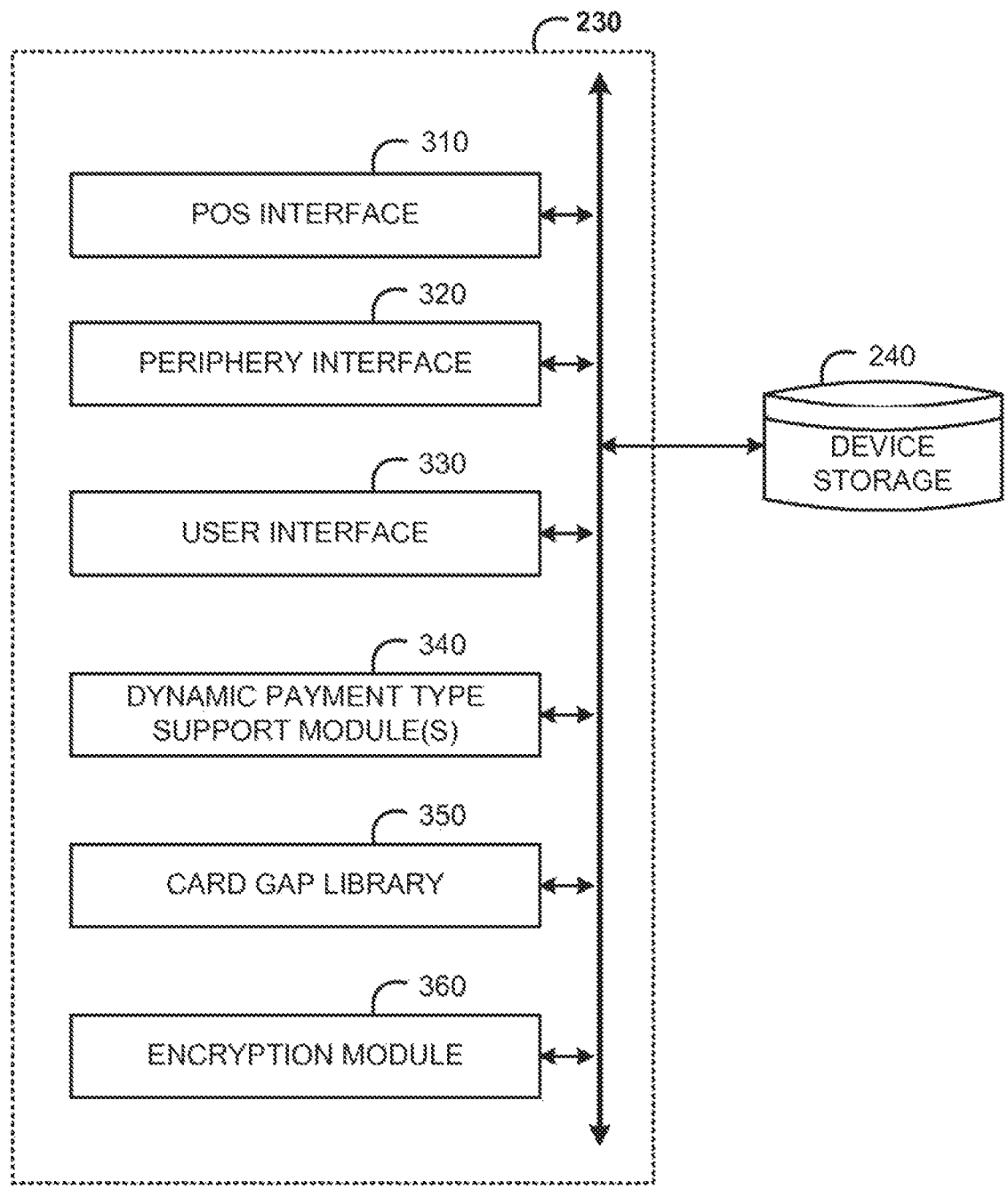
FIG. 3 is an example schematic block diagram of the Payment Processing Interface payment system, in accordance with some embodiments.

FIG. 3 provides even further detail for one example embodiment of the Payment Processing Interface payment system 230. The Payment Processing Interface payment system 230 includes a series of interfaces that enable display and communication with other integral portions of the system. For example, a POS interface 310 may enable the launch of the Payment Processing Interface payment system 230 upon choosing "checkout" within the POS 220 system. Likewise, the periphery interface 320 enables the Payment Processing interface payment system 230 to collect account data via the card reader 250. The user interface 330 provides a graphical interface for the user to select payment types, input transaction amounts, and view transaction confirmation.

A dynamic payment support module 340 may exist for each payment type supported by the Payment Processing Interface payment system 230. While credit and debit cards are clearly the initial concern for most merchants 102, others may appreciate a payment system that may utilize virtual currencies (such as Bitcoin), nontraditional payment brokers (such as PayPal), loyalty rewards systems, gift cards, and the like. Each payment type requires the appropriate interface in order to proceed with the transaction.

The next component of the Payment Processing Interface payment system 230 is the Payment Processing Interface library 350 which includes the code required to interface with the peripheral device 250 or alternate payment types (as indicated in the previous paragraph). The Payment Processing Interface library 350 is enabled to receive updates and additional entries to enable additional peripheral devices 250, as they become relevant. The Payment Processing Interface library 350 feature enables the near universal functionality of any peripheral device 250 with the supported payment systems 108. Since the Payment Processing Interface resource is separate from the POS system, the utilization of such libraries enables an on the fly ability to update with new payment types without the need for POS developers to re-integrate, test and redistribute their POS application to die merchants every lime a new payment type is desired. This reduces headache for merchants, and reduces developer input requirements.

The Payment Processing Interface payment system 230 may also include an encryption module 360 for the instances when the peripheral device 250 does not encrypt the account data immediately upon card swipe. Again, this latent encryption is less secure than true E2E encryption; however, it may help to increase security as compared to transmission in the clear.

Figure 4:
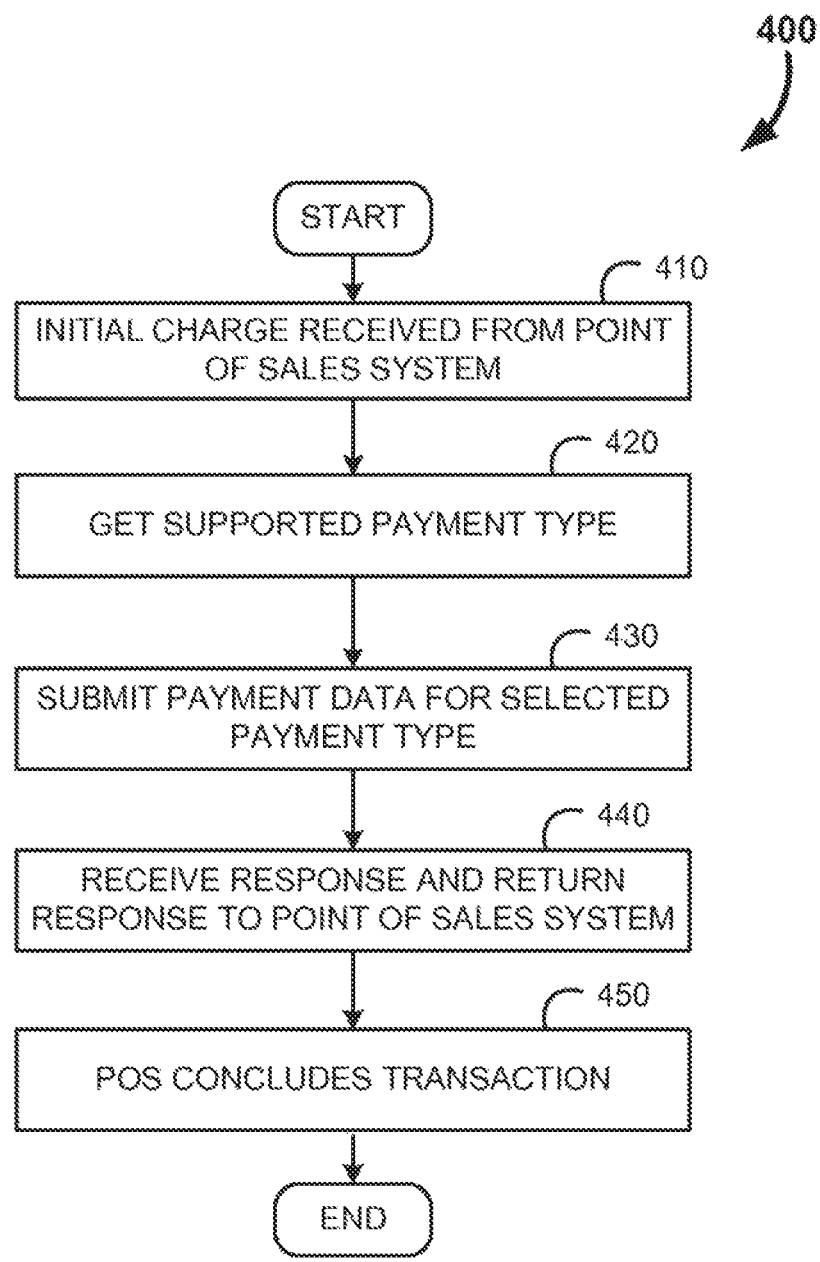
FIGS. 4-8 are example process flow diagrams for making a payment using a mobile device with the Payment Processing Interface payment system, in accordance with some embodiments.
Figure 5:
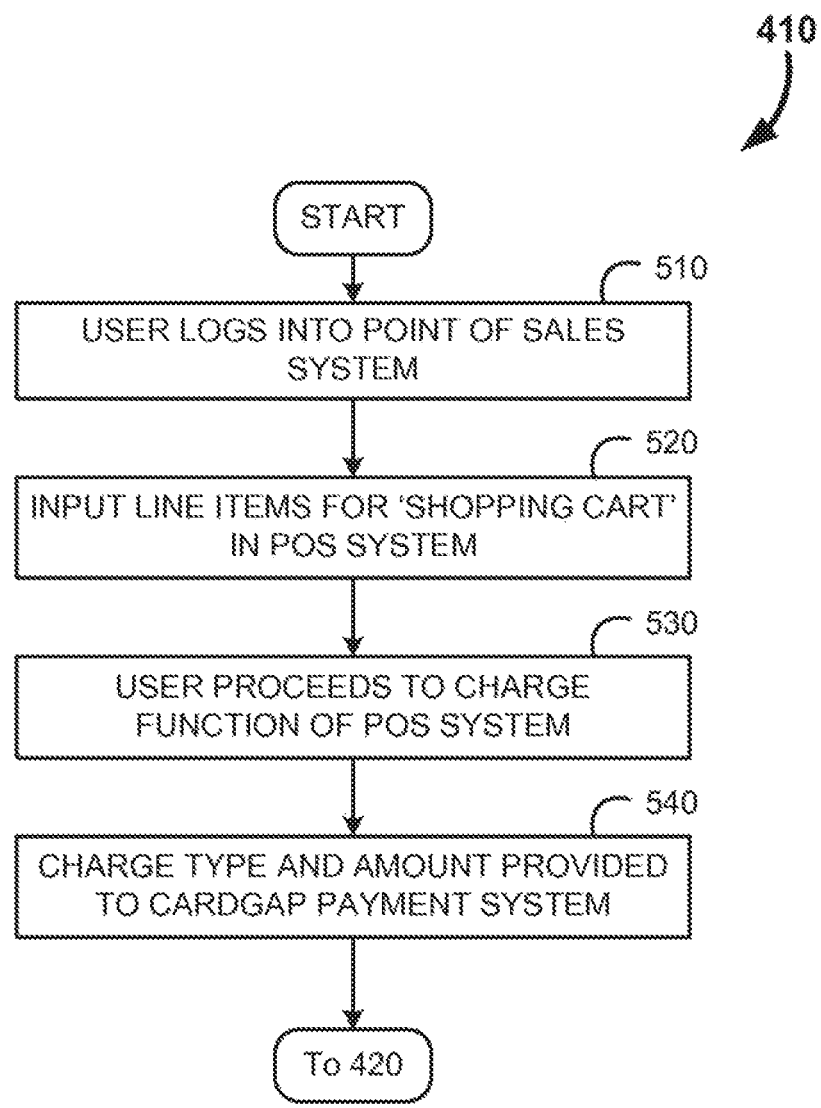

Now that the system for the payment on a mobile platform has been described in considerable detail, attention will be turned to processes for the operation of the payment system utilizing the Payment Processing Interface resource Bundle. To facilitate discussion of said processes, attention is directed to FIG. 4, which provides an example high level process How for the payment process on a mobile device, shown generally at 400. Initially the Payment Processing Interface system receives the charge from the PCS system (at 410). This process is expounded upon in reference to FIG. 5. Here the merchant initially logs into the point of sales system (at 510). Point of sales systems may include native applications on the mobile device, or commonly may include web based POS systems. Web based systems, in particular, often have difficulty integrating with peripheral devices. The Payment Processing Interface resource bundle bridges the gap between POS system and peripheral device for the POS developers. The merchant then enters line items (at 520) for a customer's purchase into the external Point of Sales system. The system compiles a final charge, and the Payment Processing Interface program may be launched to handle the payment processing (at 530). Once Payment Processing Interface is launched, the payment type and amount to be charged are provided (at 540).

Figure 6:
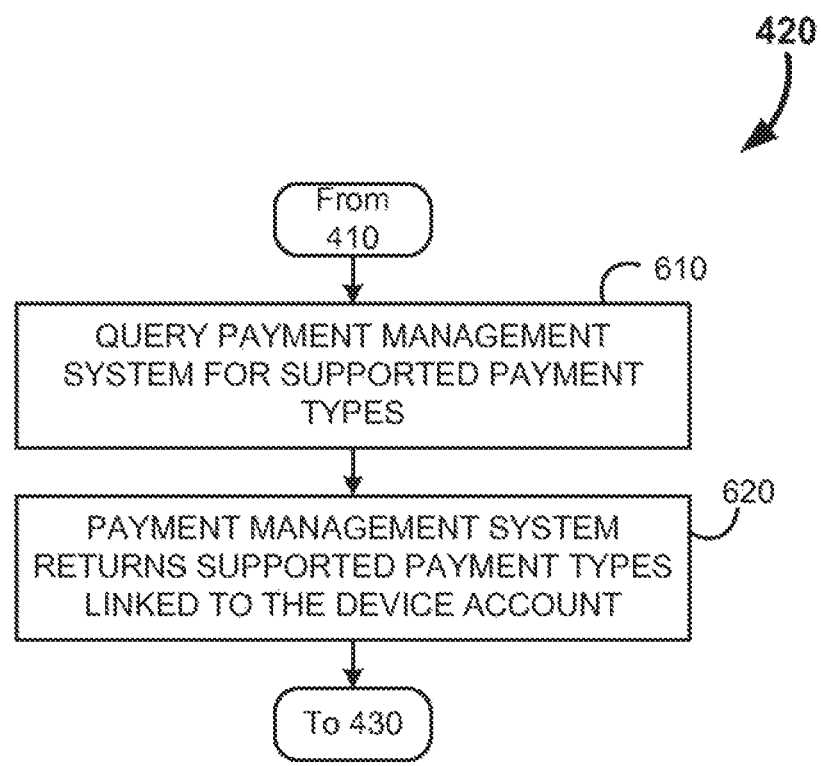

Returning to FIG. 4, after the Payment Processing Interface system receives the charge from the POS system, the Payment Processing Interface system gets the supported payment type (at 420). This process is provided in greater detail in reference to FIG. 6. In order to get the supported payment type, the Payment Processing Interface system initially queries the payment management system, via the network, for supported payment types (at 610). The payment management system then returns the supported payment types which are linked to that merchant's account (at 620). As the Payment Processing Interface resource bundle is separate from the POS system, the number of supported payment types may be substantial. Additionally, by leveraging the Payment Processing interface library, additional payment types can be readily pushed to the Payment Processing interface resource on the fly, and without any meaningful developer input.

Figure 7:
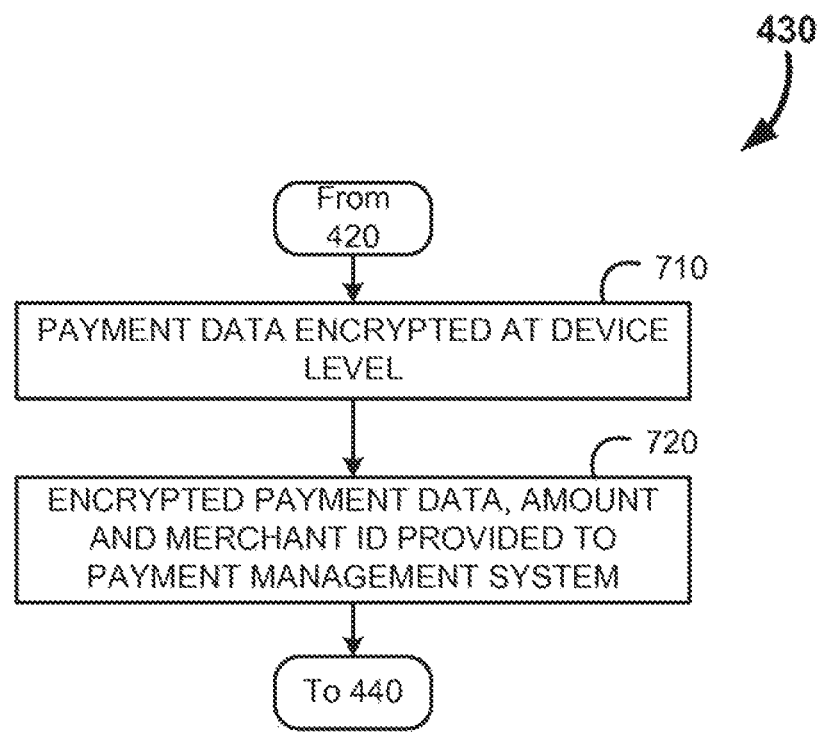

Returning to FIG. 4, the next step is to submit payment data for the selected payment type (at 430). This process is provided in greater detail in reference to FIG. 7, where the payment data is captured from the peripheral device and encrypted at the device level (at 710). The encrypted payment account data, amount, and merchant ID are then provided to the payment management system (at 720) for payment verification.

Figure 8:
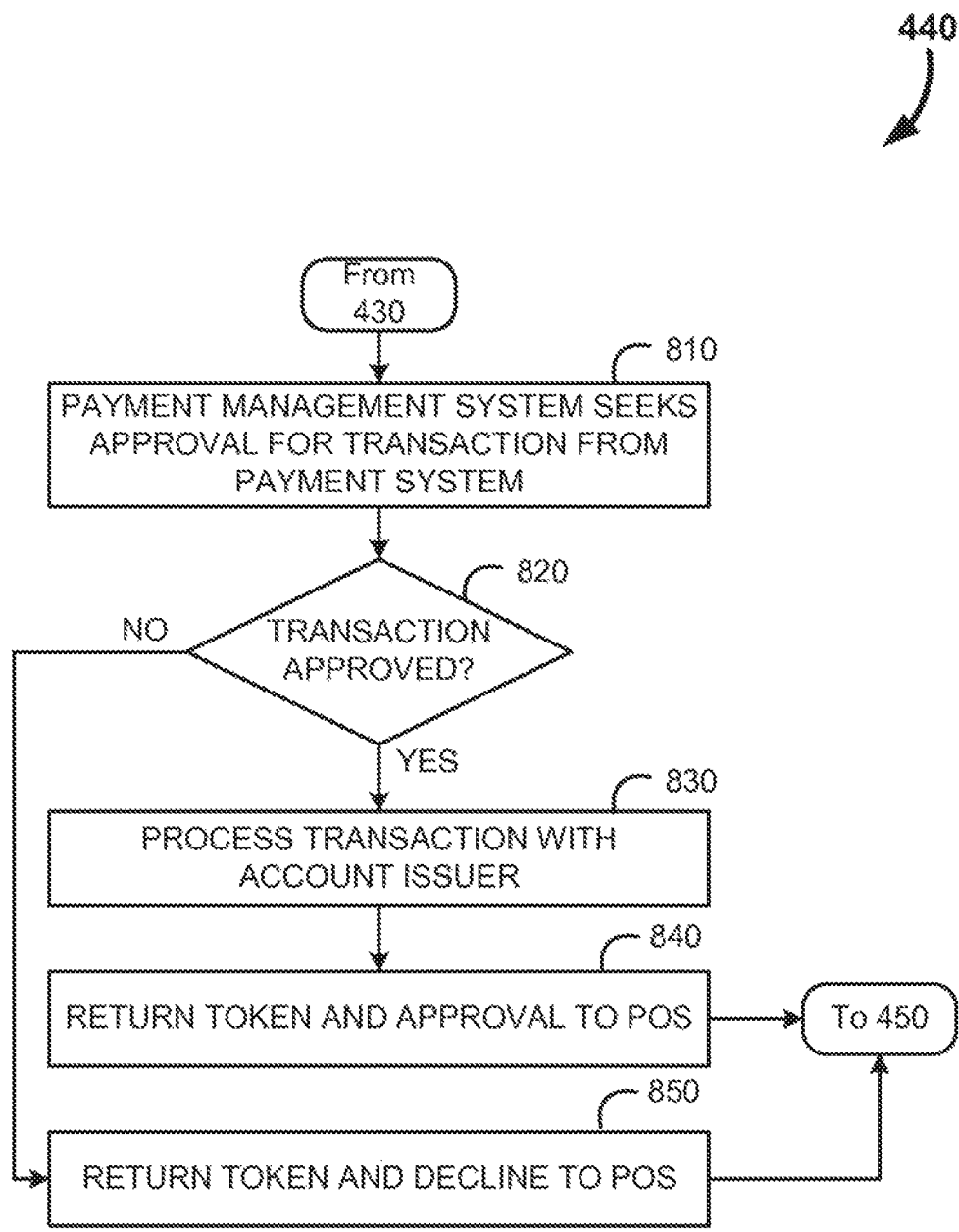

Returning to FIG. 4, the payment management system and other backend systems verifies the transaction, and returns a response to the Payment Processing Interface system (at 440), which may likewise be relayed to the POS system. FIG. 8 provides greater details of the process for verification of the transaction. As discussed previously, the payment management system may seek approval (at 810) for the transaction form the payment system (i.e., Visa, MasterCard, etc.). If the transaction is approved (at 820), then the transaction is processed with the account issuer for the transfer of the appropriate funds (at 830). Likewise, a token for the account information may be generated and returned, along with the approval, to the point of sales (at 840). Alternatively, if the transaction is declined (at 820), the token may be returned with a decline message (at 850).

Returning to FIG. 4, after the payment response has been received, the point of sales system may conclude the transaction (at 450). This may include displaying whether the transaction was approved or declined, seeking an electronic signature from the purchaser, and generating a receipt.

Although not illustrated, the Payment Processing Interface resource bundle would additionally enable other functionalities, such as unsolicited push notifications for coupons etc. as value added services to the merchant and the customers. For example, a customer making a purchase near the lunch hour could receive a notification after their purchase of a nearby eatery, along with a coupon for lunch. Since the merchant's location may be collected by GPS coordinates, in some embodiments, such temporal and geo-specific offers may be provided.

II. Examples

Now that the systems and methods for payment processing on mobile devices has been described in considerable detail, attention will be drawn to a series of example screenshot images for the user experience of using such a system. While these examples are relatively narrow interpretations of specific embodiments of the presently disclosed systems and methods, these examples are not intended to limit the scope of the embodiments, but rather illustrate one exemplary implementation of the payment processing for enhanced clarity.

Figure 9:
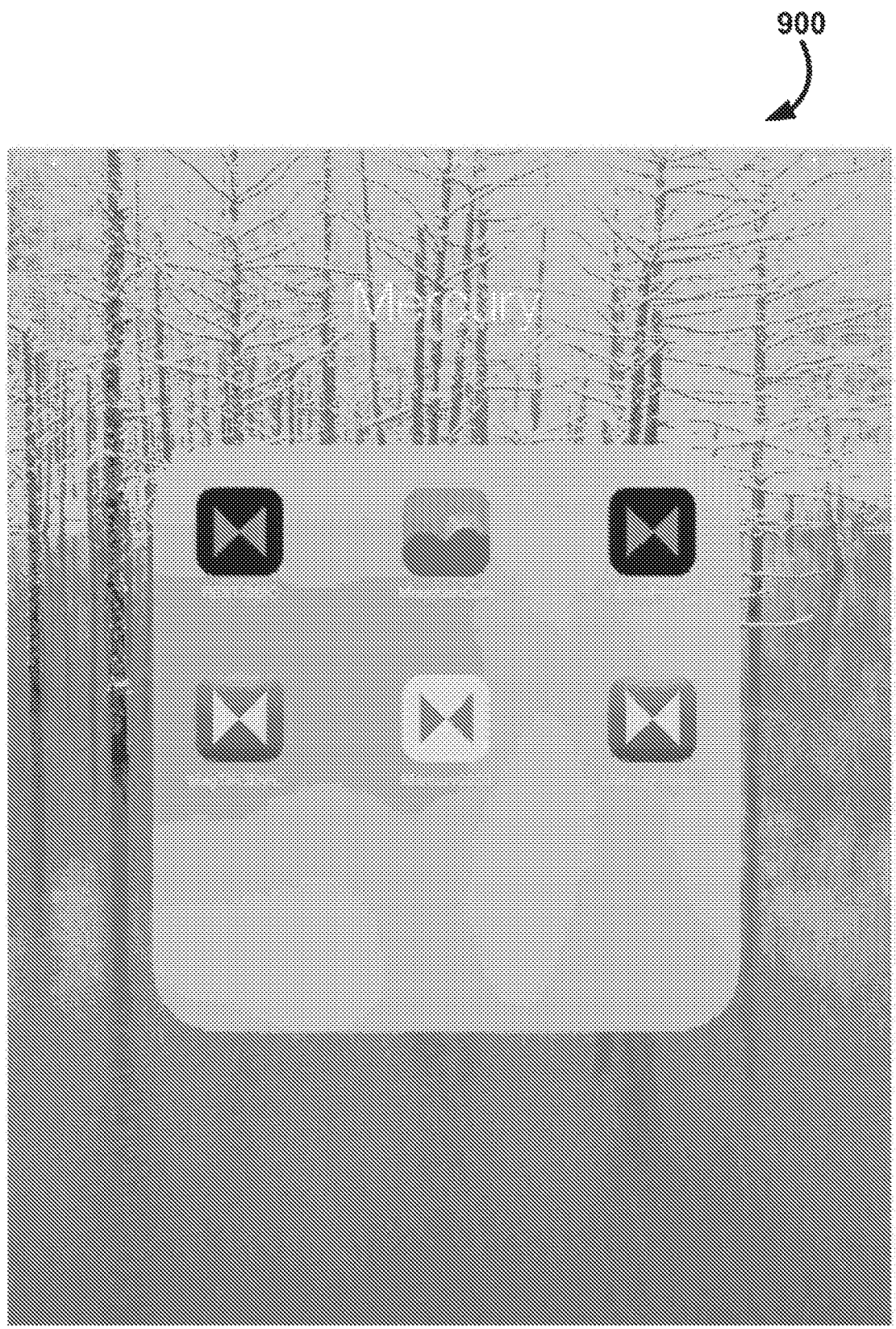
FIGS. 9-20 are example screenshots of a mobile payment on an example mobile device, in accordance with some embodiments.

FIG. 9 provides the first example illustration of a transaction progression on a mobile device, shown generally at 900. The sample screenshots provided are illustrated as being viewed on an iPad tablet. It should be understood that any device capable of computing is suitable for implementation of the Payment Processing interface resource bundle, however mobile devices such as tablets and smart phones are particularly well suited for employing such systems due to the difficulty of developer integration.

Figure 10:
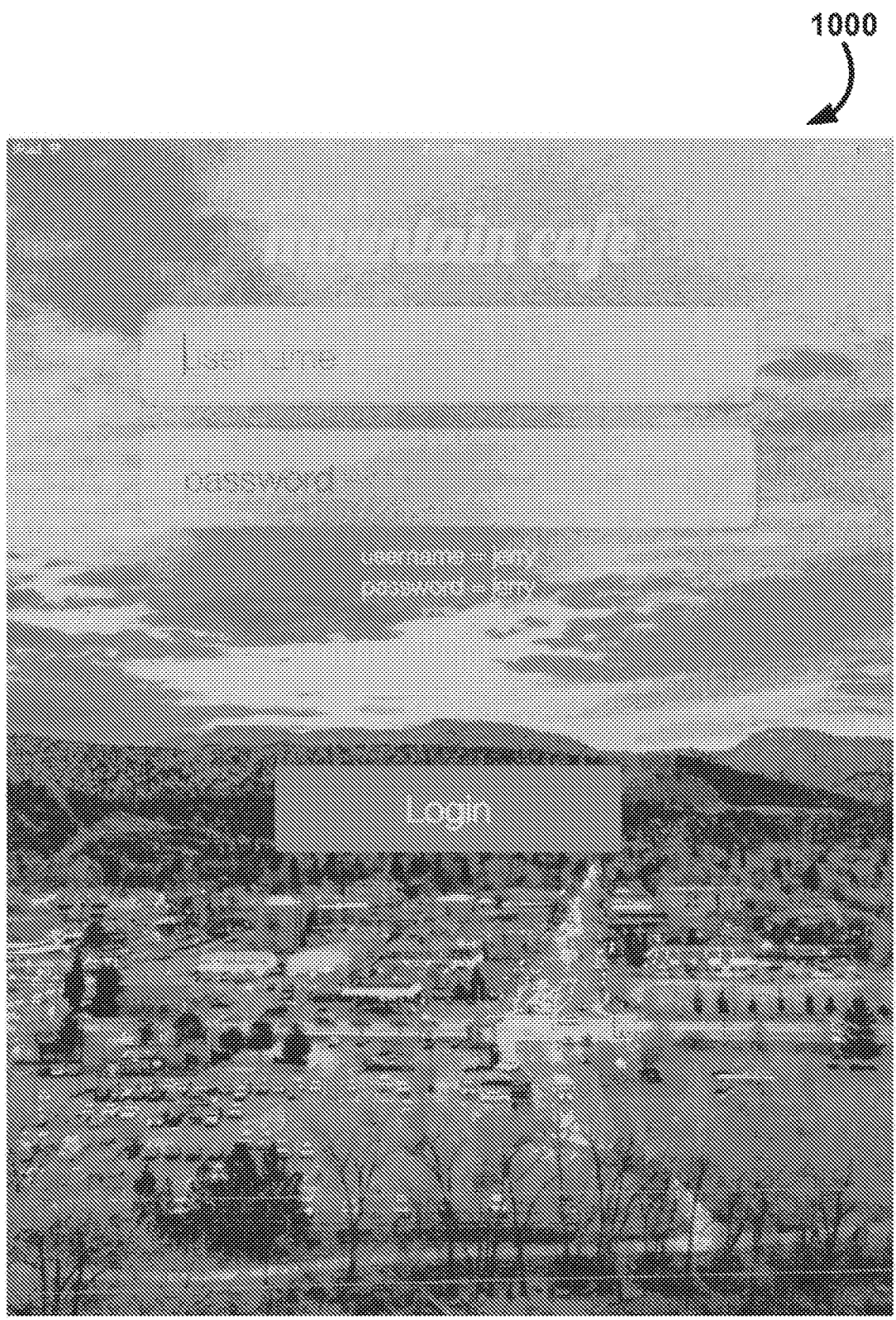
Figure 11:
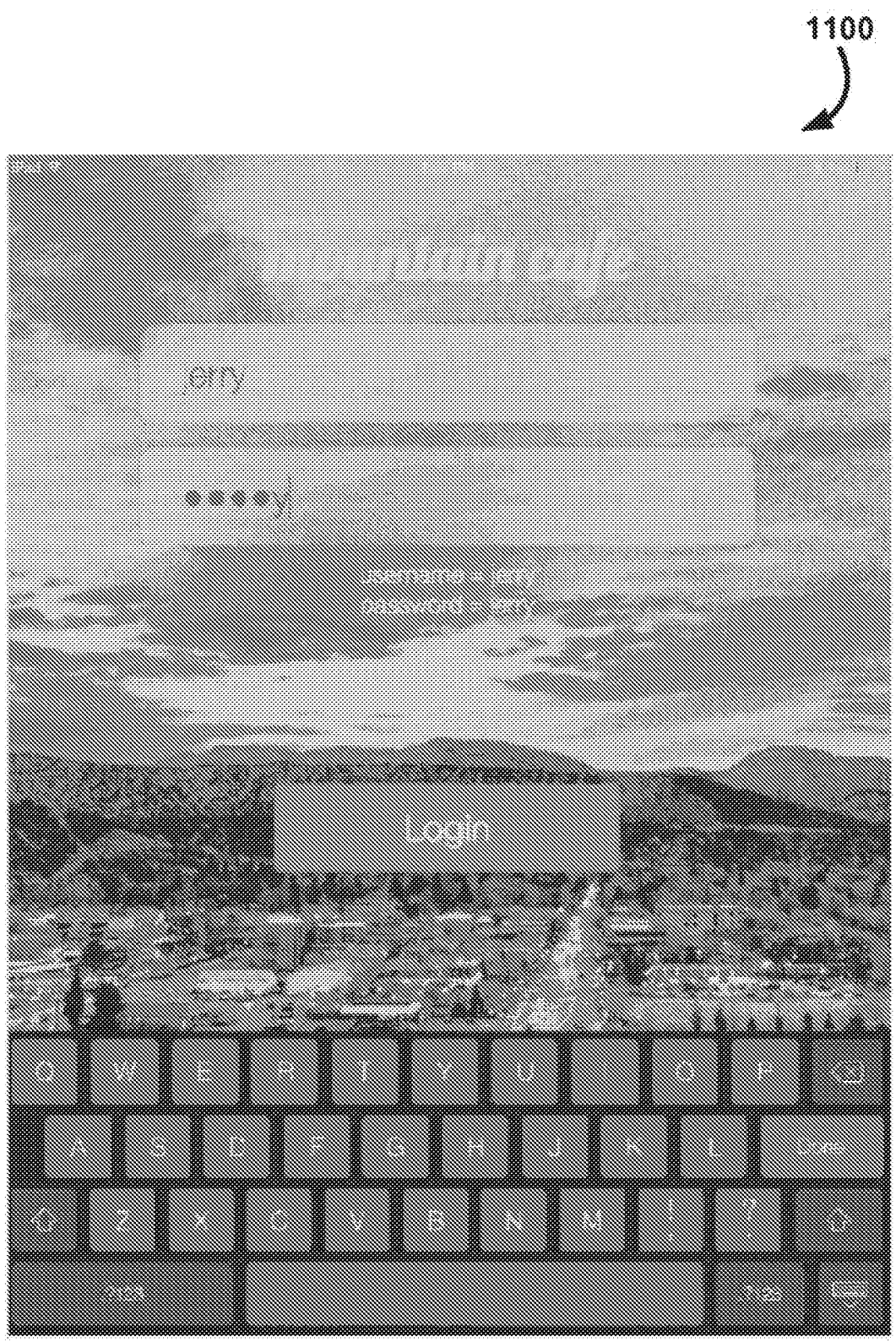

In this figure, a merchant's homepage is illustrated with tiles corresponding to applications. One such application is labeled as "Mountain Café" which corresponds to a point of sales system tailored to a café. When the merchant selects this application, the screen changes to the POS login page, as seen in reference to 1000 of FIG. 10. A login page requires at least a username and password in order to ensure that the merchant is authentic. Additional security measures, such as MAC address or certificates may additionally be employed, as is known in the art, to ensure user authenticity. FIG. 11 illustrates the merchant entering the appropriate username and password, as seen at 1100. On many touch screen enabled devices a virtual keyboard will be displayed to the user to assist in entering the text information.

Figure 12:
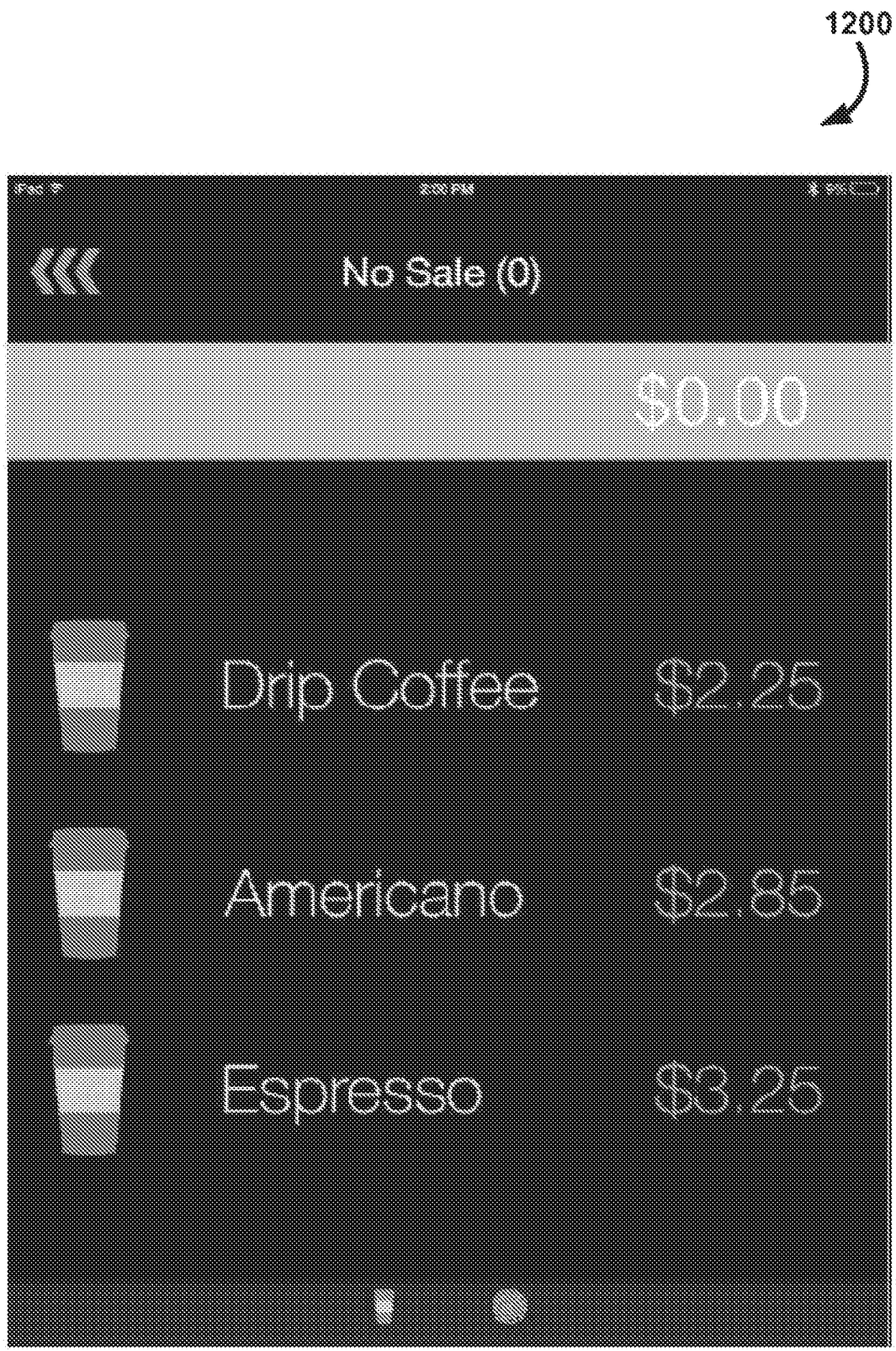

After logging in, the merchant is directed to the point of sales interface, as seen at 1200 of FIG. 12. The point of sales interface may vary significantly across different point of sales systems. The presently illustrated POS interface is rather simplistic given the relatively few products sold by the merchant. In this example interface, a list of products is displayed and may be selected by simply touching the relevant item. A total is illustrated at the top. However, for more complicated merchants, it may be required to have an inventory line item management system that is hierarchical, or which includes the ability to customize products, depending upon the products or services offered. As the present system and methods operate outside of the POS system, it should be recognized that any suitable POS system, either native or web based, may be employed.

Figure 13:
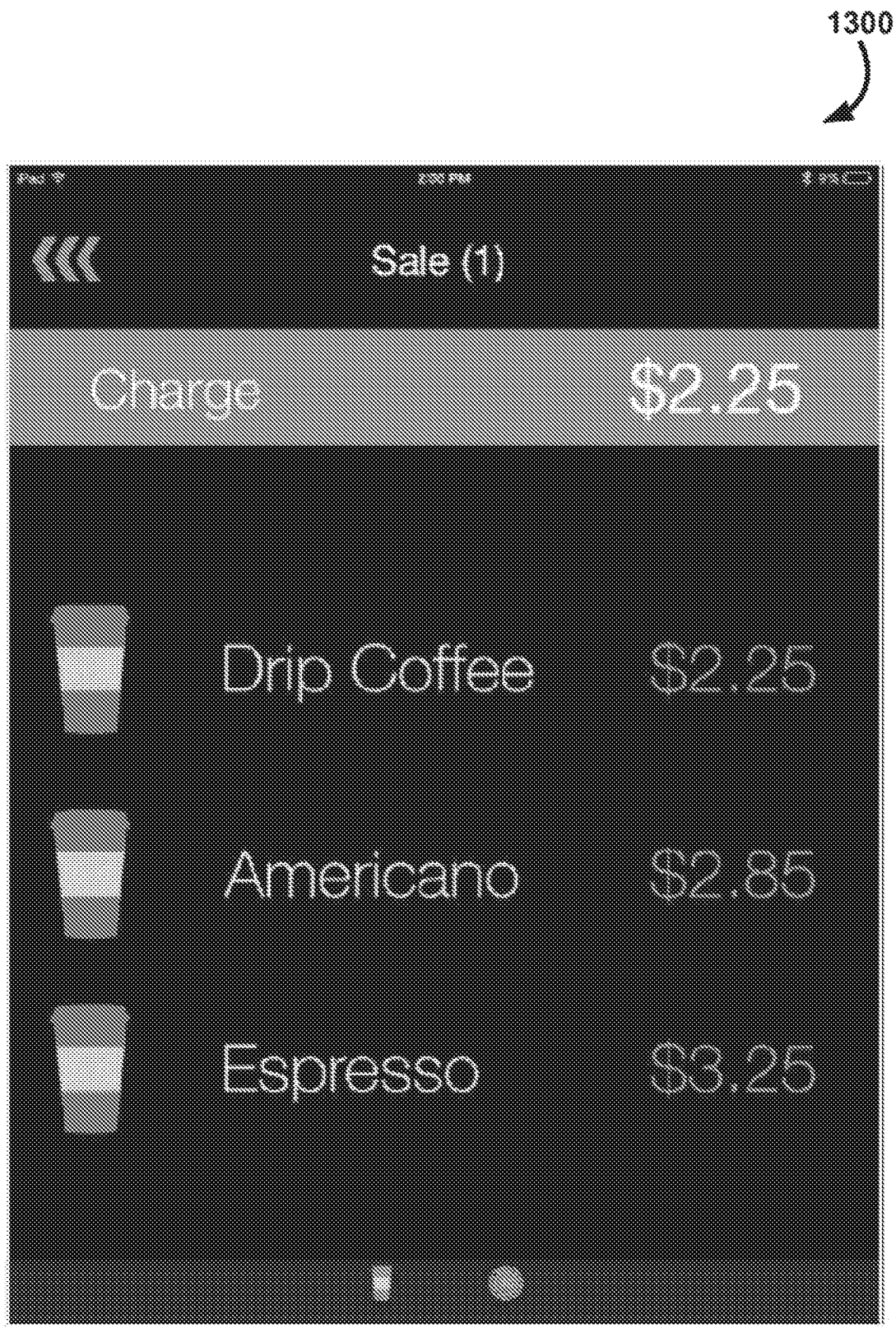
Figure 14:
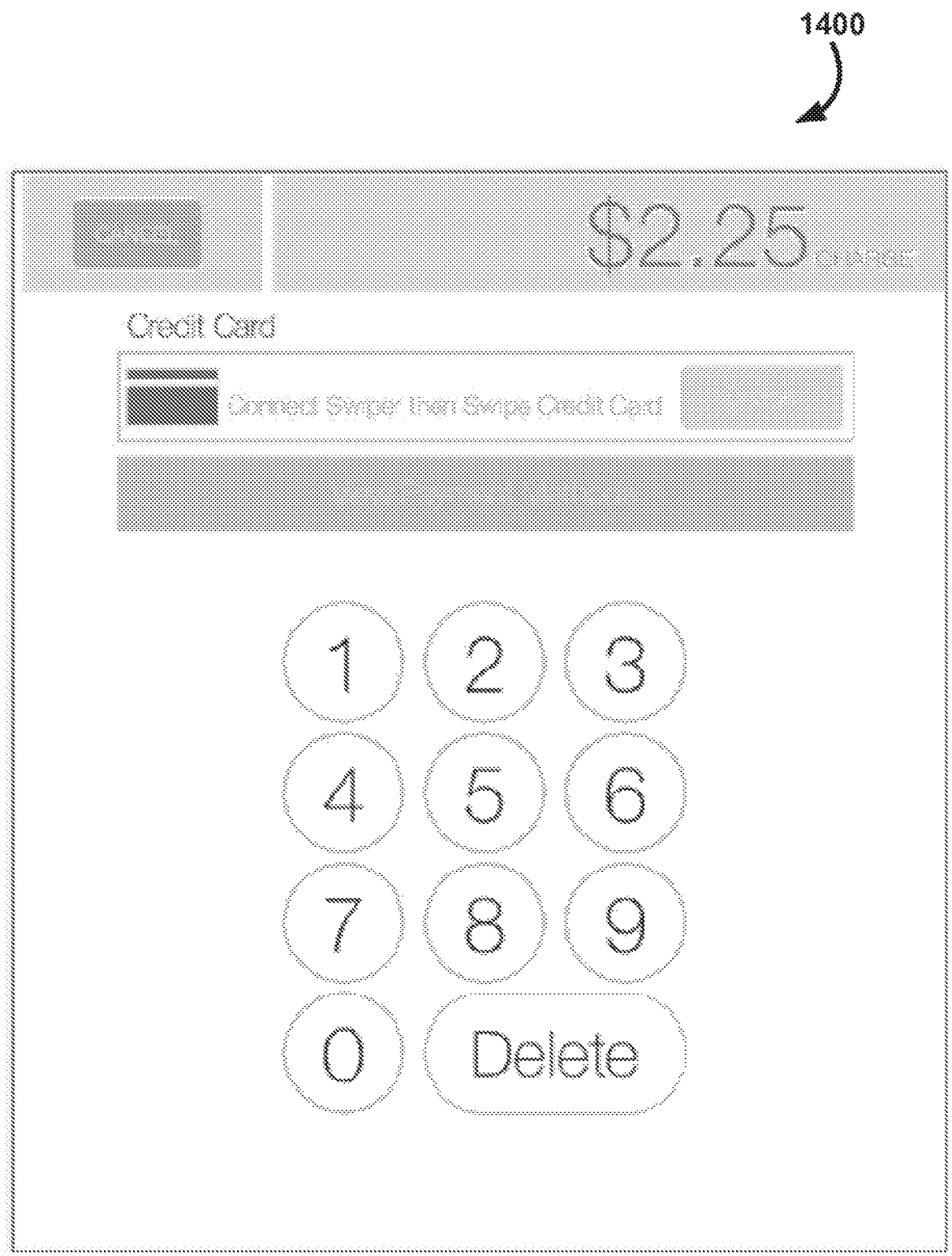

In FIG. 13, the merchant has selected a line item (drip coffee) and the amount has been added to the total, as seen at 1300. At this stage, the merchant selects the "charge" button to launch the Payment Processing Interface resource bundle. Regardless of POS system being employed, the Payment Processing Interface interface may appear identical due to the fact that Payment Processing Interface is independent from the POS application. In some cases, the Payment Processing Interface resource bundle is embedded within the POS application. FIG. 14 illustrates the Payment Processing interface interface, at 1400. The total charge may be imported from the POS system, or may be manually keyed in by the user. The payment method type is presented as being a credit card. The user may select "view payment methods" to select an alternate payment type. The Payment Processing Interface resource bundle auto detects the peripheral device card reader. In this instance, no reader is yet detected, and as such the message "connect swiper then swipe card" is displayed.

The Payment Processing Interface resource bundle leverages a library of payment types, as previously discussed, to support different payment types. Once a peripheral card reader device is connected to the tablet, the Payment Processing Interface bundle determines if the appropriate library is present to enable compatibility. If not, the payment management system may be queried for the library, and an update may be pulled into the system to allow for usage, in some embodiments. The merchant may then swipe the card, and input the security code and/or zip code for enhanced security, using the illustrated keypad.

As previously mentioned, while magnetic credit cards are discussed and illustrated for the sake of clarity, it is entirely possible that alternate means of inputting payment account information are also possible. For example, an RFID payment card, smart card, biometric reader where biometric data is linked to payment accounts, optical readers (e-checks), etc. are likewise considered within the scope of this invention.

Figure 15:
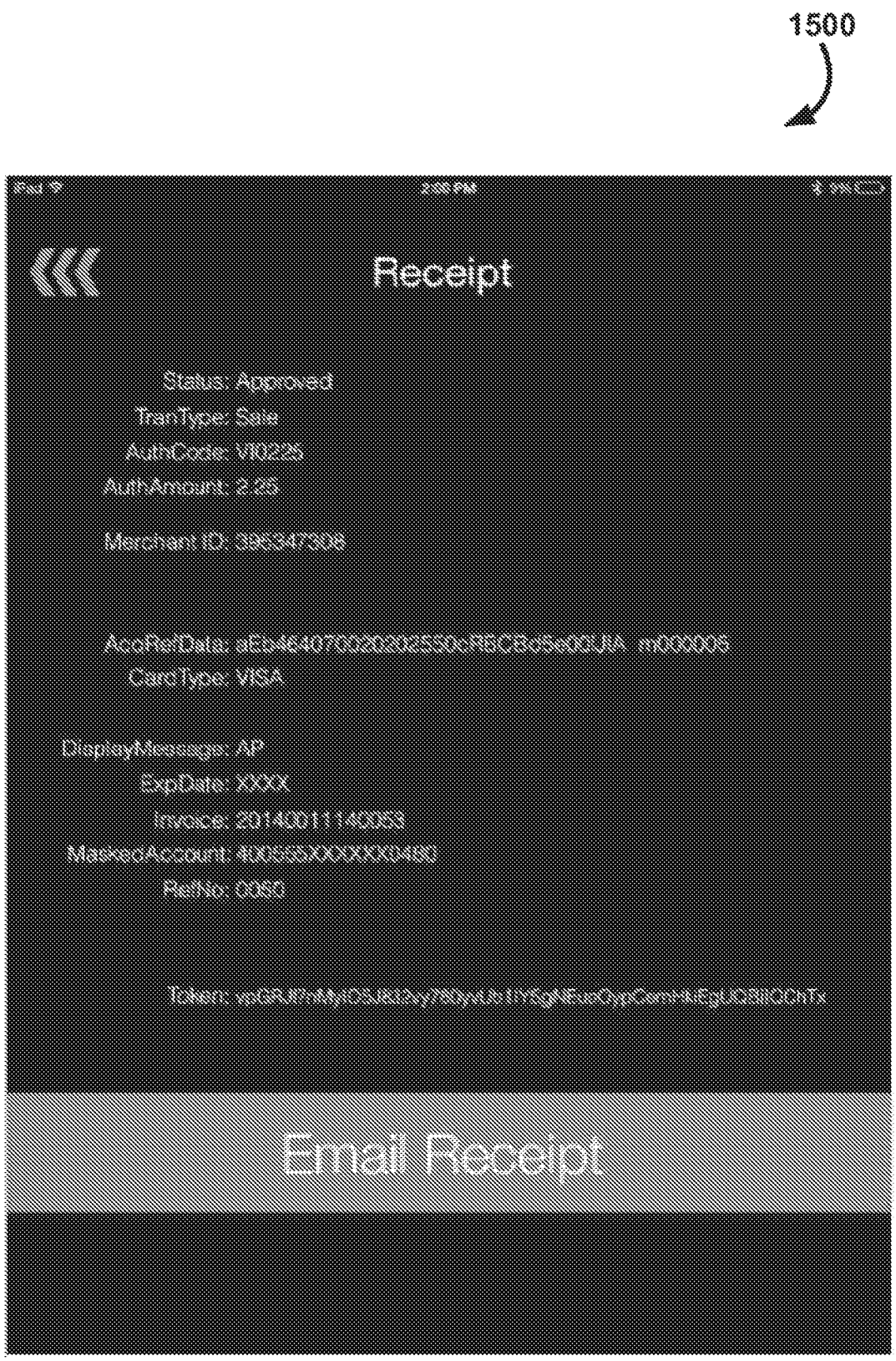
Figure 16:

After the payment information has been inputted, and encrypted at the device level, the Payment Processing Interface resource bundle may utilize network connectivity to contact the backend payment management system for the authorization of the transaction. In return, a reply (approval or denial) is received, and in some cases a token may likewise be received. This approval may be provided back to the POS system for the generation of a receipt, and completion of the transaction. FIG. 15 provides an example screenshot for the receipt, including transaction status, type of transaction, an authentication code, amount, and other useful transaction data, seen at 1500. The user often has the ability to print or email the receipt to the customer for their records. FIG. 16 illustrates such an emailed receipt, shown generally at 1600. Particular information, such as token, may be omitted from the emailed receipt for security purposes.

Figure 17:
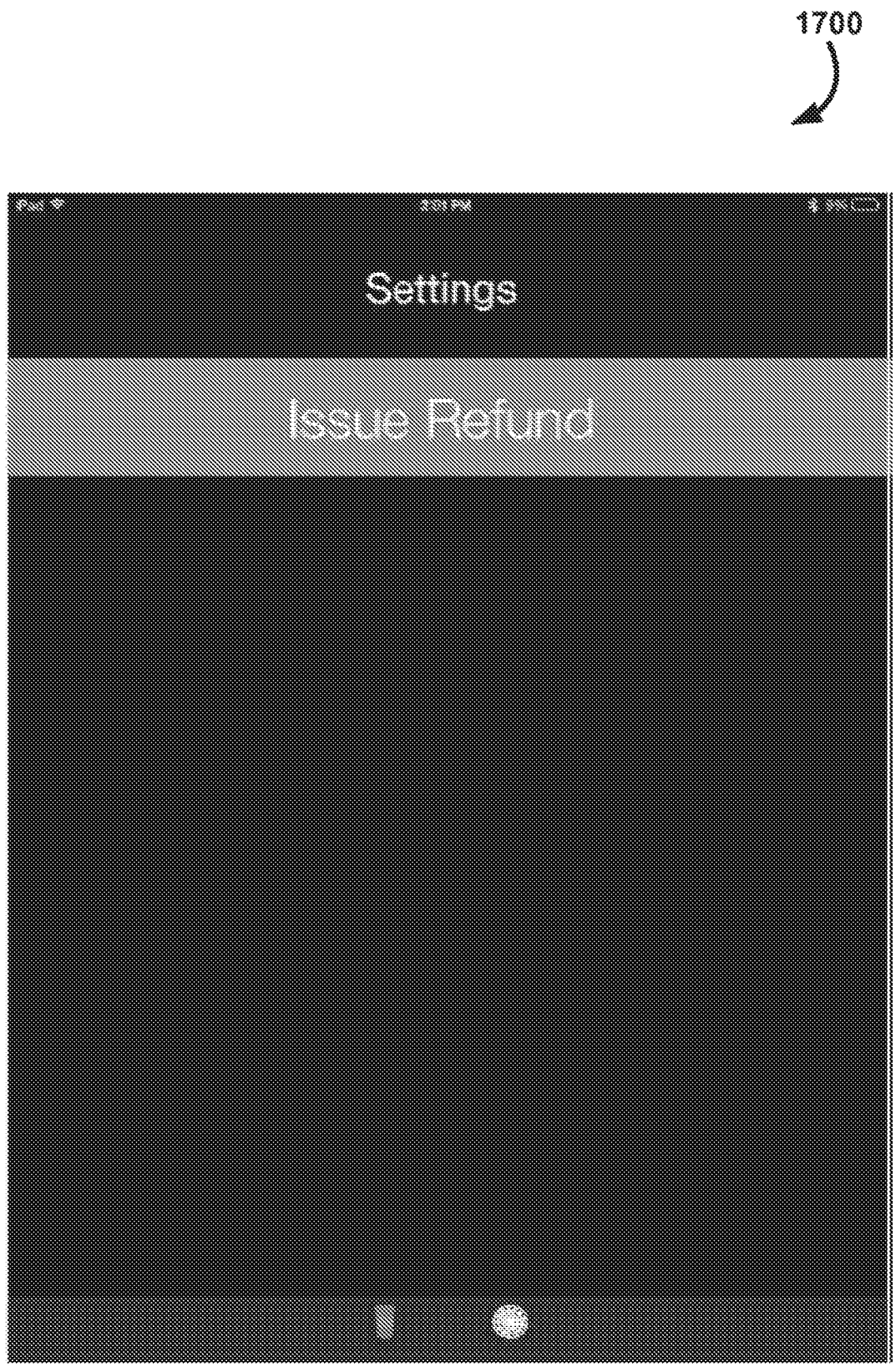

FIG. 17 provides an example screenshot of the point, of sales system where a refund is being issued, shown generally at 1700. While in this example only refunds are available, in some embodiments additional transaction types may be possible. Such alternate transaction types might include loyalty awards, for example.

Figure 18:
Figure 19:
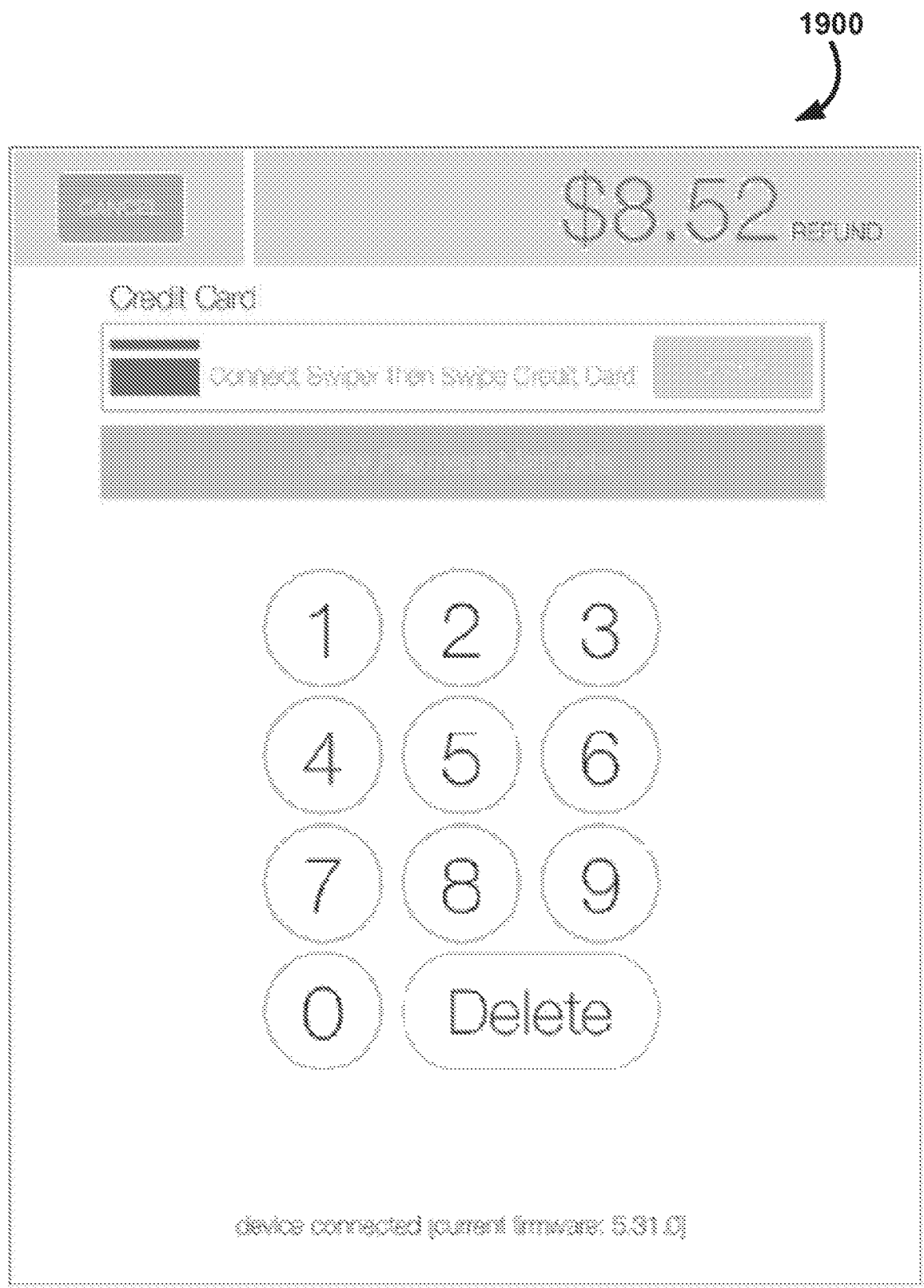
Figure 20:
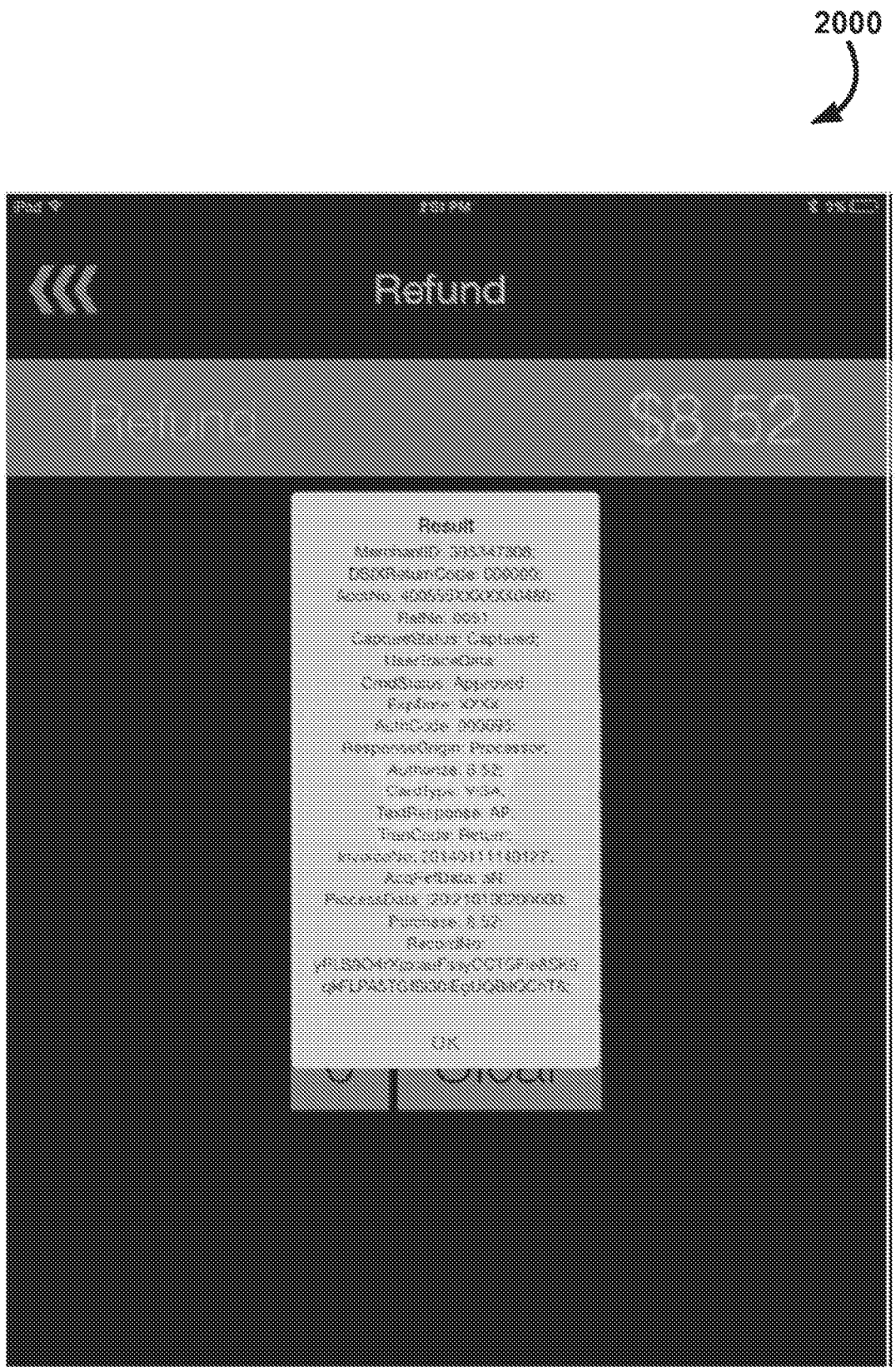

Once the refund selection is made, the merchant is directed to a screen where the amount of the refund may be keyed in, as seen at 1800 of FIG. 18. Once the refund has been selected, the Payment Processing Interface resource is again launched. Just like before, the Payment Processing Interface interface includes the amount being refunded, and enables the choice of payment methods, as may be seen at 1900 of FIG. 19. Upon successful entry of payment information the Payment Processing Interface may interact with the payment management system and ensure the funds are transferred appropriately. A receipt for the refund is returned, as may be seen at 2000 in reference to FIG. 20.

III. System Embodiments

Figure 21A:
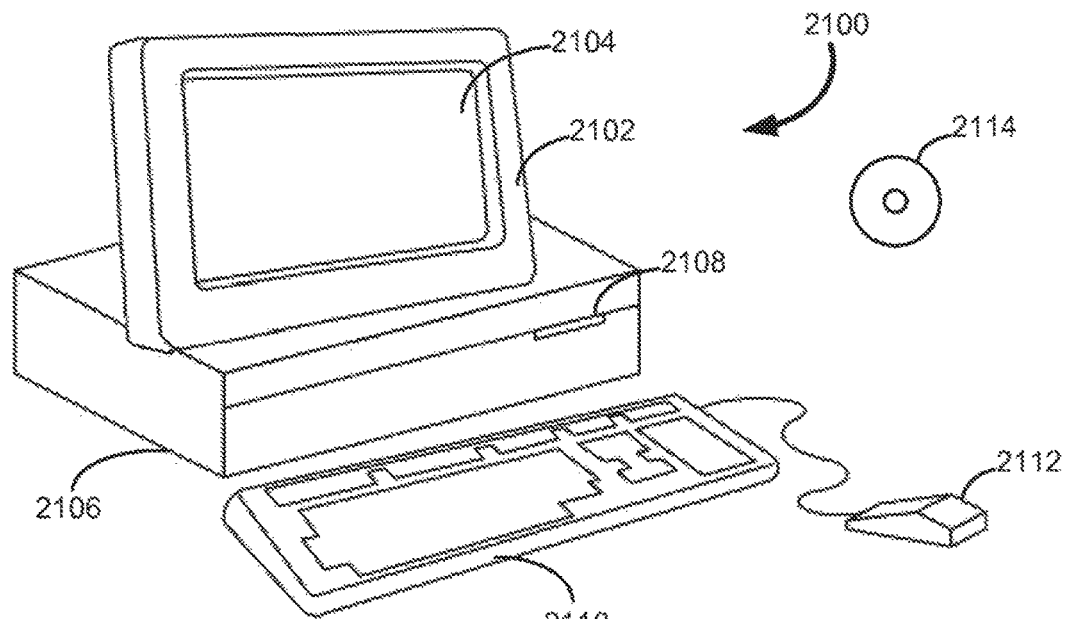
FIGS. 21A and 21B are example illustrations for computer systems configured to embody payment management systems, in accordance with some embodiments.
Figure 21B:
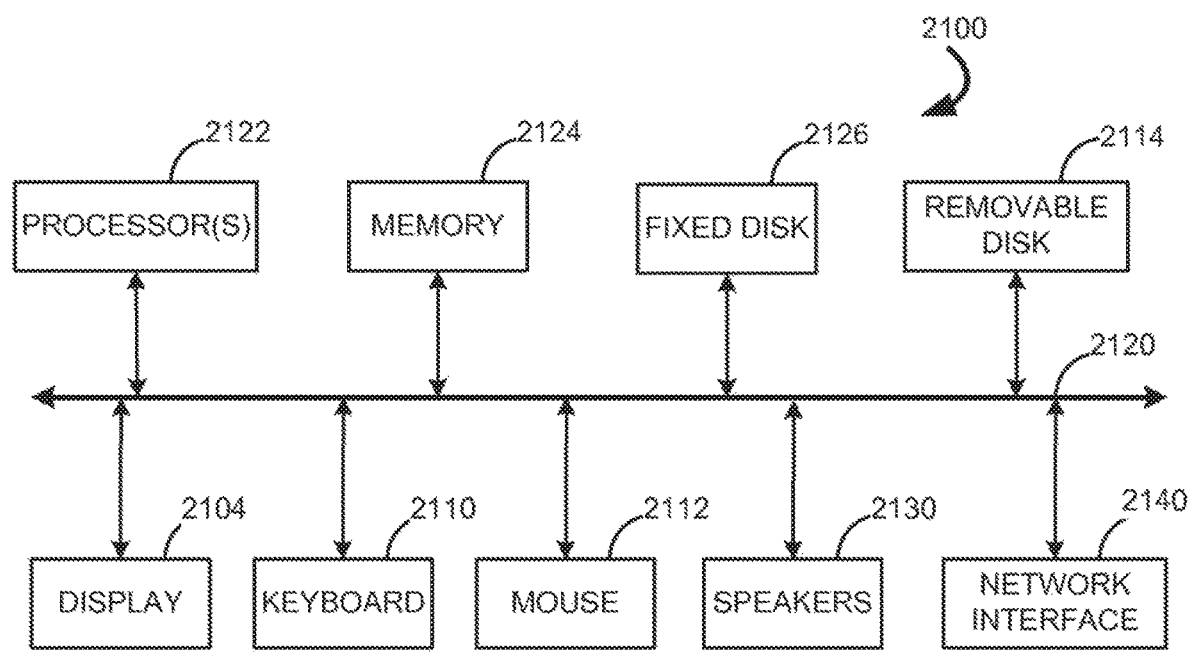

FIGS. 21A and 21B illustrate a Computer System 2100, which is suitable for implementing embodiments of the present invention, including payment management systems. FIG. 21A shows one possible physical form of the Computer System 2100. Of course, the Computer System 2100 may have many physical forms ranging from a printed circuit board, an integrated circuit, and a small handheld device up to a huge supercomputer. Computer system 2100 may include a Monitor 2102, a Display 2104, a Housing 2106, a Disk Drive 2108, a Keyboard 2110, and a Mouse 2112. Disk 2114 is a computer-readable medium used to transfer data to and from Computer System 2300.

In addition to the standard desktop, or server, computer system illustrated, it is fully within the scope of this disclosure that any computer system capable of the required storage and processing demands would be suitable for embodying the present invention. This may include tablet devices, smart phones, pin pad devices, and any other computer devices, whether mobile or even distributed on a network (i.e., cloud based).

FIG. 21B is an example of a block diagram for Computer System 2100. Attached to System Bus 2120 are a wide variety of subsystems. Processor(s) 2122 (also referred to as central processing units, or CPUs) are coupled to storage devices, including Memory 2124. Memory 2124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 2126 may also be coupled bi-directionally to the Processor 2122; it provides additional data storage capacity and may also include any of the computer-readable media described below. Fixed Disk 2126 may be used to store programs, data, and the like and is typically a secondary storage medium (such as a hard disk) that is slower than primary storage. It will be appreciated that the information retained within Fixed Disk 2126 may, in appropriate cases, be incorporated in standard fashion as virtual memory in Memory 2124. Removable Disk 2114 may take the form of any of the computer-readable media described below.

Processor 2122 is also coupled to a variety of input output devices, such as Display 2104, Keyboard 2110, Mouse 2112 and Speakers 2130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor 2122 optionally may be coupled to another computer or telecommunications network using Network Interface 2140. With such a Network Interface 2140, it is contemplated that the Processor 2122 might receive information from the network, or might output information to the network in the course of performing the above-described payment processing for mobile devices. Furthermore, method embodiments of the present invention may execute solely upon Processor 2122 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

In sum, the present disclosure provides systems and methods for payment processing of transactions through mobile devices. Such systems and methods enable mobile payments to be performed without the need for extensive developer integration to the peripheral card reader. This enables developers and merchants to access a wider market of payment options.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer-implemented method for electronic transaction type and peripheral device integration, the method comprising:
   receiving, by an electronic transaction interface system, an electronic transaction amount from a point of sale system of a mobile device;
   querying, in response to receiving the electronic transaction amount and by the electronic transaction interface system over an electronic network, a payment management system for a plurality of supported electronic transaction types, the plurality of supported electronic transaction types being linked to an account of a user of the mobile device and comprising two or more of: a virtual currency, a traditional payment vehicle, a non-traditional payment broker, or a loyalty rewards system;
   receiving, by the electronic transaction interface system, a selection of an electronic transaction type among the plurality of supported electronic transaction types;
   detecting, by the electronic transaction interface system, a peripheral device being connected to the mobile device, wherein the peripheral device is configured to interface with a payment vehicle associated with the selected electronic transaction type to collect transaction information;
   automatically determining, in response to detecting the peripheral device, whether a first library entry for the peripheral device and a second library entry for the selected electronic transaction type is present at the electronic transaction interface system, wherein the first library entry comprises data utilized by the point of sale system to interface with the peripheral device and wherein the second library entry comprises other data utilized to support the electronic transaction type;
   automatically querying, in response to determining that at least one of the first library entry or the second library entry is not present and by the electronic transaction interface system over the electronic network and without receipt of additional user input, a payment processing interface library of the payment management system for the at least one of the first library entry or the second library entry that is not present, wherein the payment processing interface library is configured to be updated with new library entries;
   receiving, by the electronic transaction interface system over the electronic network, the at least one of the first library entry or the second library entry that is not present; and
   interfacing, by the electronic transaction interface system and using the first library entry and the second library entry, with the peripheral device in accordance with the selected electronic transaction type.

2. The computer-implemented method of claim 1, wherein the peripheral device comprises one of: a magnetic card reader, a smart card reader, an optical reader, a biometric reader, an e-wallet interface.

3. The computer-implemented method of claim 1, wherein the interfacing, by the electronic transaction interface system and using the first library entry, with the peripheral device in accordance with the selected electronic transaction type comprises receiving, by the electronic transaction interface system and using the first library entry, an electronic transaction data from the peripheral device in accordance with the selected electronic transaction type.

4. The computer-implemented method of claim 3, further comprising:
   transmitting, by the electronic transaction interface system over the electronic network, the electronic transaction amount and electronic transaction data to the payment management system; and
   receiving, by the electronic transaction interface system over the electronic network, a response from the payment management system.

5. The computer-implemented method of claim 4, wherein the response comprises a token, wherein the token includes primary account information in an encrypted format.

6. The computer-implemented method of claim 4, wherein the response comprises one of: a decline message, an approval message.

7. The computer-implemented method of claim 3, wherein at least a portion of the electronic transaction data is encrypted at a reader head of the peripheral device.

8. A system for electronic transaction type and peripheral device integration, the system comprising:
   one or more processors;
   a data storage storing instructions which, when executed by the one or more processors, cause the one or more processors to perform a method comprising:
      receiving, by an electronic transaction interface system, an electronic transaction amount from a point of sale system of a mobile device;

querying, in response to receiving the electronic transaction amount and by the electronic transaction interface system over an electronic network, a payment management system for a plurality of supported electronic transaction types, the plurality of supported electronic transaction types being linked to an account of a user of the mobile device and comprising two or more of: a virtual currency, a traditional payment vehicle, a nontraditional payment broker, or a loyalty rewards system;

receiving, by the electronic transaction interface system, a selection of an electronic transaction type among the plurality of supported electronic transaction types;

detecting, by the electronic transaction interface system, a peripheral device being connected to the mobile device, wherein the peripheral device is configured to interface with a payment vehicle associated with the selected electronic transaction type to collect transaction information;

automatically determining, in response to detecting the peripheral device, whether a first library entry for the peripheral device and a second library entry for the selected electronic transaction type is present at the electronic transaction interface system, wherein the first library entry comprises data utilized by the point of sale system to interface with the peripheral device and wherein the second library entry comprises other data utilized to support the electronic transaction type;

automatically querying, in response to determining that at least one of the first library entry or the second library entry is not present and by the electronic transaction interface system over the electronic network and without receipt of additional user input, a payment processing interface library of the payment management system for the at least one of the first library entry or the second library entry that is not present the library entry for the peripheral device and selected electronic transaction type, wherein the payment processing interface library is configured to be updated with new library entries;

receiving, by the electronic transaction interface system over the electronic network, the at least one of the first library entry or the second library entry that is not present library entry; and interfacing, by the electronic transaction interface system and using the first library entry and the second library entry, with the peripheral device in accordance with the selected electronic transaction type.

9. The system of claim 8, wherein the peripheral device comprises one of: a magnetic card reader, a smart card reader, an optical reader, a biometric reader, an e-wallet interface.

10. The system of claim 8, wherein the interfacing, by the electronic transaction interface system and using the first library entry, with the peripheral device in accordance with the selected electronic transaction type comprises receiving, by the electronic transaction interface system and using the first library entry, an electronic transaction data from the peripheral device in accordance with the selected electronic transaction type.

11. The system of claim 10, wherein the method further comprises:

transmitting, by the electronic transaction interface system over the electronic network, the electronic transaction amount and electronic transaction data to the payment management system; and receiving, by the electronic transaction interface system over the electronic network, a response from the payment management system.

12. The system of claim 11, wherein the response comprises a token, wherein the token includes primary account information in an encrypted format.

13. The system of claim 11, wherein the response comprises one of: a decline message, an approval message.

14. The system of claim 10, wherein at least a portion of the electronic transaction data is encrypted at a reader head of the peripheral device.

15. A non-transitory computer readable medium for electronic transaction type and peripheral device integration, the non-transitory computer readable medium comprising instruction which, when executed by one or more processors, cause the one or more processors to perform a method comprising:

receiving, by an electronic transaction interface system, an electronic transaction amount from a point of sale system of a mobile device;

querying, in response to receiving the electronic transaction amount and by the electronic transaction interface system over an electronic network, a payment management system for a plurality of supported electronic transaction types, the plurality of supported electronic transaction types being linked to an account of a user of the mobile device and comprising two or more of: a virtual currency, a traditional payment vehicle, a nontraditional payment broker, or a loyalty rewards system;

receiving, by the electronic transaction interface system, a selection of an electronic transaction type among the plurality of supported electronic transaction types;

detecting, by the electronic transaction interface system, a peripheral device being connected to the mobile device, wherein the peripheral device is configured to interface with a payment vehicle associated with the selected electronic transaction type to collect transaction information;

automatically determining, in response to detecting the peripheral device, whether a first library entry for the peripheral device and a second library entry for the selected electronic transaction type is present at the electronic transaction interface system, wherein the first library entry comprises data utilized by the point of sale system to interface with the peripheral device and wherein the second library entry comprises other data utilized to support the electronic transaction type;

automatically querying, in response to determining that at least one of the first library entry or the second library entry is not present and by the electronic transaction interface system over the electronic network and without receipt of additional user input, a payment processing interface library of the payment management system for the at least one of the first library entry or the second library entry that is not present the library entry for the peripheral device and selected electronic transaction type, wherein the payment processing interface library is configured to be updated with new library entries;

receiving, by the electronic transaction interface system over the electronic network, the at least one of the first library entry or the second library entry that is not present library entry; and interfacing, by the electronic transaction interface system and using the first library entry and the second library entry, with the peripheral device in accordance with the selected electronic transaction type.

16. The computer readable medium of claim 15, wherein the peripheral device comprises one of: a magnetic card reader, a smart card reader, an optical reader, a biometric reader, an e-wallet interface.

17. The computer readable medium of claim 15, wherein the interfacing, by the electronic transaction interface system and using the first library entry, with the peripheral device in accordance with the selected electronic transaction type comprises receiving, by the electronic transaction interface system and using the first library entry, an electronic transaction data from the peripheral device in accordance with the selected electronic transaction type.

18. The computer readable medium of claim 17, wherein the method further comprises:
   transmitting, by the electronic transaction interface system over the electronic network, the electronic transaction amount and electronic transaction data to the payment management system; and
   receiving, by the electronic transaction interface system over the electronic network, a response from the payment management system.

19. The computer readable medium of claim 18, wherein the response comprises a token, wherein the token includes primary account information in an encrypted format.

20. The computer readable medium of claim 18, wherein the response comprises one of: a decline message, an approval message.

\* \* \* \* \*